United States Patent [19]

Dach et al.

[11] 4,005,620

[45] Feb. 1, 1977

[54] HYDRAULIC GEAR-SHIFT CONTROL FOR AUTOMOTIVE TRANSMISSION SYSTEMS

[75] Inventors: Hansjörg Dach, Friedrichshafen; Robert Marion, Lindau, both of Germany

[73] Assignee: Zahnradfabrik Friedrichshafen AG, Friedrichshafen, Germany

[22] Filed: Apr. 23, 1975

[21] Appl. No.: 570,773

[52] U.S. Cl. .................................. 74/865; 74/869
[51] Int. Cl.² ........................................ B60K 41/18
[58] Field of Search ............. 74/865, 867, 868, 869

[56] References Cited

UNITED STATES PATENTS

| | | | |
|---|---|---|---|
| 3,561,296 | 2/1971 | Iijima | 74/869 |
| 3,593,599 | 7/1971 | Dach | 74/869 |
| 3,667,323 | 6/1972 | Irie | 74/869 X |
| 3,752,015 | 8/1973 | Murakami | 74/869 |
| 3,831,465 | 8/1974 | Murakami | 74/869 |
| 3,840,039 | 10/1974 | Shellman | 74/867 X |
| 3,895,542 | 7/1975 | Miyauchi | 74/867 X |
| 3,895,547 | 7/1975 | Murakami | 74/867 |

*Primary Examiner*—Samuel Scott
*Assistant Examiner*—Lance W. Chandler
*Attorney, Agent, or Firm*—Karl F. Ross; Herbert Dubno

[57] ABSTRACT

To control the changeover between different speed ratios in an automotive transmission, with the aid of hydraulically actuatable clutches and brakes, a 1-2 shift valve (70) and a 2-3 shift valve (90) responsive to a speed-dependent fluid pressure are subjected to a countervailing load-dependent fluid pressure generated by a throttle valve (40), under the control of the vehicular accelerator, above a predetermined intermediate point of the load range. Fluid for the actuation of the clutches and brakes, under a pressure rising in the lower part of the load range and remaining constant in its upper part, is delivered by a modulating valve (340) in cascade with the throttle valve, provided with a limitedly displaceable slider, or by cascaded modulating and limiting valves (350, 357).

10 Claims, 6 Drawing Figures

HYDRAULIC GEAR-SHIFT CONTROL FOR AUTOMOTIVE TRANSMISSION SYSTEMS

FIELD OF THE INVENTION

Our present invention relates to a hydraulic load-control system of the type used in automotive transmissions with automatic gear shift.

BACKGROUND OF THE INVENTION

In commonly owned U.S. Pat. Nos. 3,559,669, 3,580,112, 3,593,599 and 3,610,070 there has been described a transmission system of this type wherein an output shaft, such as a traction-wheel shaft of a vehicle, is driven from a fuel-powered engine with a variable torque ratio via a set of hydraulic coupling elements, namely clutches and brakes (collectively referred to as drive-establishing means), which are shiftable under fluid pressure to provide different torque ratios. The selection of any of these torque ratios, normally referred to as "first gear", "second gear" and "third gear", is controlled by fluid-actuatable switchover means in the form of a 1-2 shift valve and a 2-3 shift valve responsive to two oppositely effective fluid pressures. One of these fluid pressures, varying generally proportionally with the speed of the output shaft, emanates from a first pressure modulator in the form of a speed-responsive pressure regulator and tends to actuate the switchover means in an upshifting sense against a biasing spring force supplemented by the other fluid pressure. This latter pressure, derived from an engine-driven pump, is regulated by a master valve so as to vary with load, as described in U.S. Pat. No. 3,593,599; for this purpose, a throttle valve controlled by a manually operable accelerator (such as a vehicular gas pedal) is inserted in a hydraulic feedback loop of the master valve so as to translate a progressive displacement of the accelerator from a retracted position to an advanced position into a correspondingly increasing fluid pressure at an outlet of the master valve acting as a second pressure modulator. This load-dependent fluid pressure is delivered on the one hand to the shift valves, for the purpose of resisting upshifting, and on the other hand to the hydraulic clutches and brakes. As the accelerator advances from its retracted position past a predetermined intermediate position, i.e. in an upper part of the load range, the throttle valve — acting as a third pressure modulator — places the shift valves under additional pressure to create a hysteresis effect which under given load conditions causes upshifting (e.g. from first to second gear) to take place at a higher output-shaft speed then downshifting (e.g. from second to first gear). The term "load" as used in this context refers to the displacement of the accelerator, or of a valve piston operatively coupled therewith, from the normal retracted position considered as zero load.

In this prior system, once the accelerator has advanced sufficiently to create the hysteresis effect, the fluid pressure of the second modulator increases proportionally with load so that upshifting as well as downshifting occurs at progressively higher speeds as the accelerator moves to full-throttle position or therebeyond into the so-called kick-down range. This is desirable since, from the viewpoints of fuel economy and passenger comfort, frequent gear shifts under low-load conditions (e.g. when driving on a level road) should be avoided. On the other hand, a fluid pressure varying substantially linearly with load is not the optimum actuating pressure for the hydraulic clutches and brakes which should be held operated under a pressure corresponding more nearly to the engine torque to be transmitted or absorbed. In the case of an internal-combustion engine, the rise of this engine torque with increasing fuel supply is relatively steep in a lower part of the load range but tapers off asymptotically in an upper part of that range.

OBJECT OF THE INVENTION

The object of our present invention, therefore, is to provide an improved load-control system of the aforedescribed type in which the fluid pressures determining the switchover points and actuating the hydraulic coupling elements conform more nearly to the respective requirements discussed above.

SUMMARY OF THE INVENTION

We realize this object, in accordance with the present invention, by the provision of a fourth pressure modulator producing a pressure which rises with increasing load in a lower part of the load range and remains substantially constant in the remainder of that range, this fourth modulator communicating directly (i.e. independently of the switchover means) with the drive-establishing means for moderating the actuation thereof by the switchover means (i.e. the 1-2 and 2-3 shift valves) by acting upon associated damping means. The fourth pressure modulator is further connected to the second pressure modulator (i.e. to a pressure-controlling port of the master valve) for progressively increasing the output pressure of the latter modulator in the lower part of the load range.

According to a more particular feature of our invention, the fourth pressure modulator comprises supplemental valve means in cascade with the throttle valve constituting the third pressure modulator, this fourth modulator comprising a modulating valve with a slider displaceable by fluid pressure existing in an output line of the throttle valve.

In one embodiment described hereinafter, the modulating valve includes stop means for arresting a fluid-actuated piston elastically coupled with the slider whenever the fluid pressure in the output line of the throttle valve rises to a predetermined value. In another embodiment, a limiting valve in cascade with the modulating valve has a spring-loaded piston displaceable under fluid pressure from the modulating valve and with venting means for relieving that pressure upon a predetermined displacement of the piston from a normal position. In either instance the pressure delivered by the fourth modulator rises steeply with increasing load and then remains substantially constant without affecting the hysteresis-controlling pressure delivered directly from the throttle valve to the shift valves.

BRIEF DESCRIPTION OF THE DRAWING

The above and other features of our invention will now be described in detail with reference to the accompanying drawing in which:

FIG. 4 is to be juxtaposed with FIGS. 2 and 3 in a representation of the overall system.

SPECIFIC DESCRIPTION

Figures 1, 6:
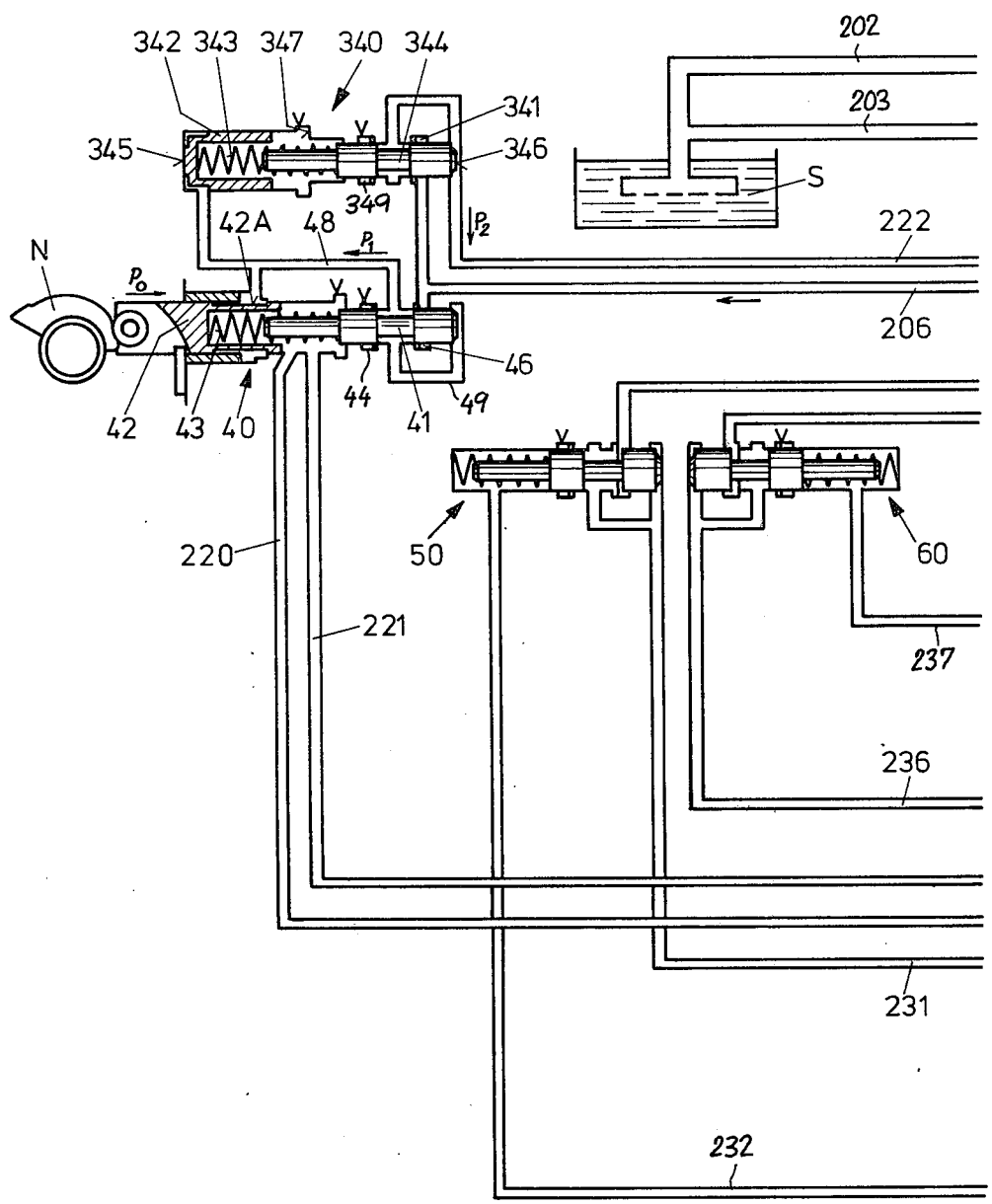
FIGS. 1-3 show details of a hydraulic load-control system embodying our invention.
FIG. 6 shows the manner in which FIG. 1
Figure 2:
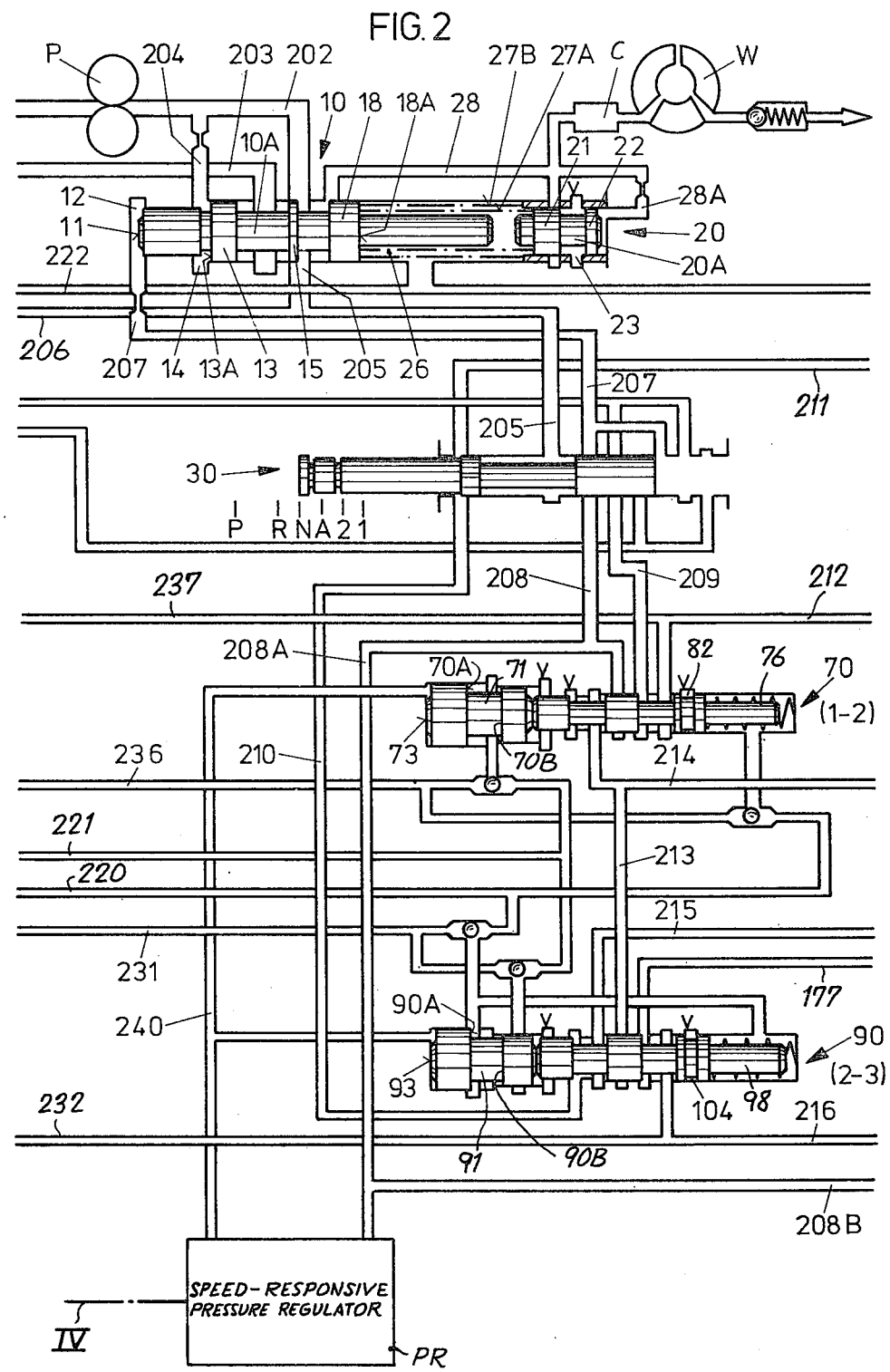
Figure 3:
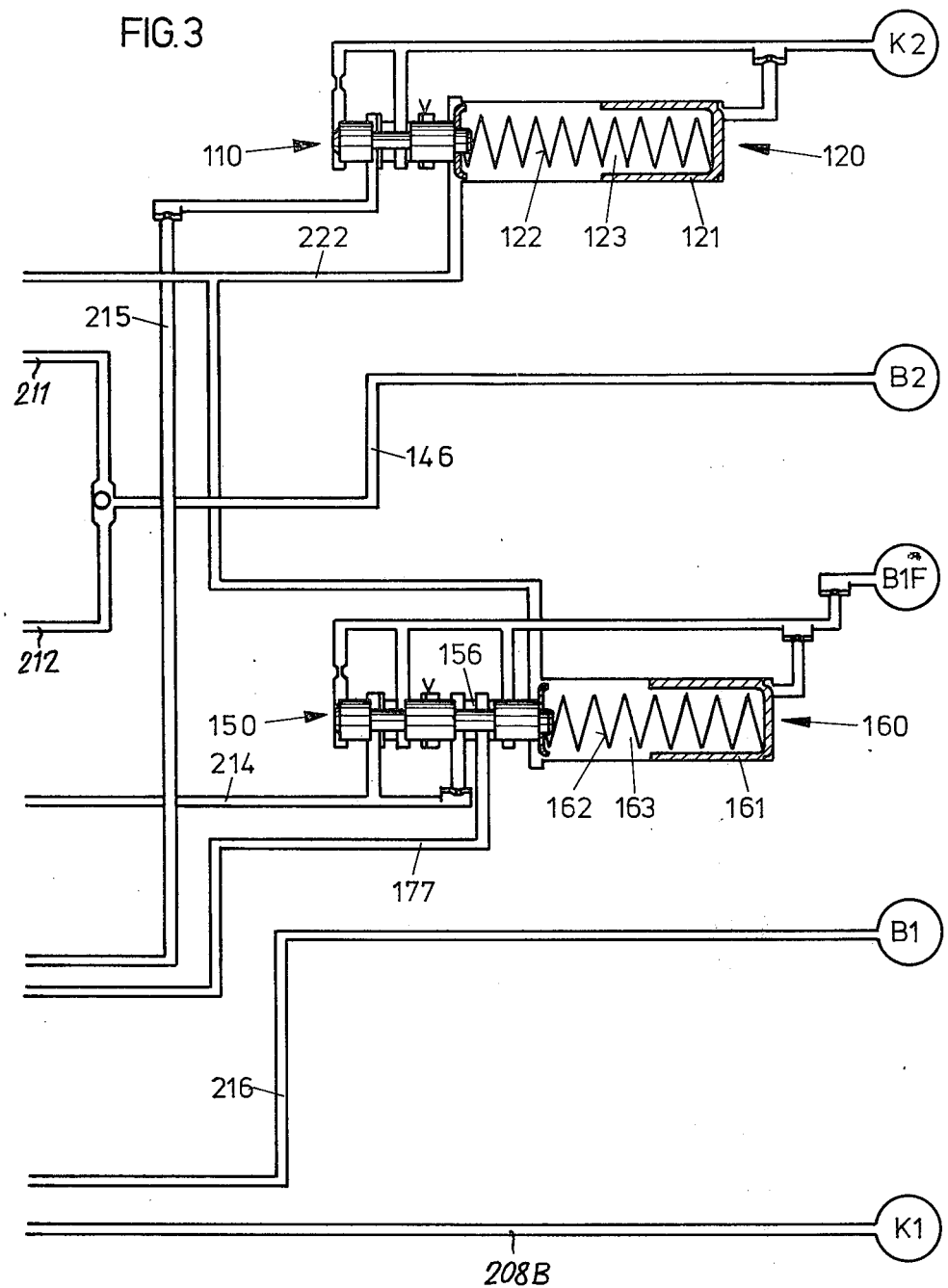

FIGS. 1–3, when placed alongside one another as indicated in FIG. 6, show a hydraulid load-control system of the same general type as those described in the aforementioned prior U.S. Pat. Nos. 3,559,669, 3,580,112, 3,593,599 and 3,610,070; the same reference characters as in those prior patents have been used in the present instance. Thus, only a brief reference to these common elements will suffice in all cases where their structure and mode of operation substantially corresponds to that described in the earlier patents.

More particularly, the system comprises an engine-driven pump P supplying oil under pressure to a master valve 10 having a piston 10A in line with a piston 20A of an ancillary valve 20. An outlet of valve 10 communicates via a line 205 with a manual speed selector 30 and via a branch line 206 with a throttle valve 40 having a plunger 42 in line with an axially slidable valve member 41 from which it is separated by a compression spring 43, the plunger being controlled by a nonillustrated accelerator pedal via a mechanical coupling here shown as a cam N. Selector 30 has an outlet 207 communicating with a space 12 adjoining a left-hand head 11 of piston 10A, an outlet 208 leading to a 1-2 shift valve 70 and in parallel therewith via a line 208A to a speed-responsive pressure regulator PR, and an outlet 209 extending to another inlet of valve 70 normally communicating with a line 212. A 2-3 shift valve 90 communicates with valve 70 by way of a line 213 and is also connected via a line 210 with selector 30, an extension 211 of line 210 merging with line 212 in a conduit 146 supplying actuating fluid for a hydraulic brake B2 in the "reverse" position R. Another brake B1 is actuatable via lines 214, 177 and 216, with valve 70 in its upshifted and valve 90 in its normal position, upon prior actuation of an unidirectionally effective brake B1F; the latter is actuable by pressure in line 214 which branches off the line 213 and terminates at an associated control valve 150 co-operating with a damper 160, a piston 161 of this damper being slidable in a cylinder 163 against the force of a spring 162. A similar control valve 110, receiving actuating fluid from valve 90 through a line 215, is associated with a clutch K2 and co-operates with a damper 120 having a piston 121 slidable in a cylinder 123 against the force of a compression spring 122. A further clutch K1 receives high-pressure fluid from a spur 208B of line 208A.

A nonillustrated unidirectional coupling (freewheel) in parallel with brake B2 intervenes in "first gear" as illustrated in U.S. Pat. No. 3,593,599; this eliminates the need for actuation of brake B2 during forward driving, except in selector positions 1 and 2 when line 209 communicates with conduit 205. Extensions 232 and 237 of lines 216 and 212 terminate at respective stop valves 50 and 60.

Valve piston 10A has further heads 13, 15 and 18, a face 18A of head 18 being engaged by two concentric coil springs 27A and 27B respectively bearing upon the piston 20A and the common housing of valves 10 and 20. A line 203 extends from a port between piston heads 13 and 15 to a sump S from which the pump P draws its fluid. A conduit 28 delivers fluid, under a pressure controlled by piston head 18, through a cooler C to a hydraulic torque converter W connected with a planetary-gear transmission which has not been further illustrated, except for its output shaft IV driving the pressure regulator PR in addition to the traction wheels of a vehicle equipped with the system of FIGS. 1–3. Clutches K1, K2 and brakes B1, B1F and B2 coact with the planetary-gear transmission in the manner fully described in the above-identified prior patents. A further conduit 204, branching off the supply line 202 and containing a restricted passage, terminates at a port 14 which opens onto a face 13A of piston head 13. Piston head 11 is of smaller diameter than heads 13, 15 and 18. A constricted branch 28A of conduit 28 opens onto a head 22 of piston 20A, another head 21 of this piston flanking with head 22 a venting port 23 communicating with the sump S.

Pressure regulator PR has an output line 240 with branches terminating at left-hand sections 73 and 93 of shift valves 70 and 90, respectively. Pistons 71 and 91 of these shift valves have differential heads with confronting faces 70A, 70B and 90A, 90B bracketing respective ports which can be alternately pressurized from a pair of lines 221, 236 in the case of valve 70 and a pair of lines 220, 231 in the case of valve 90. Lines 231 and 236 receive pressure fluid, in positions 2 and 1 of selector 30, via stop valves 50 and 60, respectively; lines 220 and 221 are successively pressurizable under the control of throttle valve 40 upon progressive rightward displacement of plunger 42 from its illustrated retracted position. Valves 70 and 90 further comprise spring-loaded sliders 76 and 98 controlling respective venting ports 82 and 104.

Figure 5:
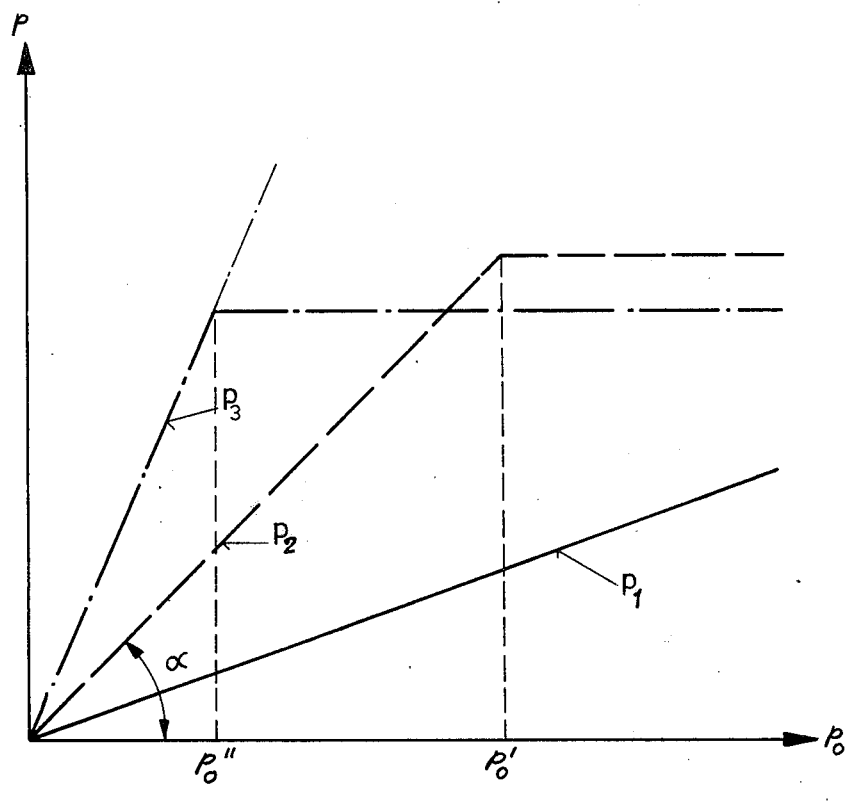
FIG. 5 is a set of graphs serving to explain the mode of operation of the system illustrated in the preceding Figures.

In accordance with our present invention, the return flow from throttle valve 40 to master valve 10 via a conduit 222 takes place by way of a modulating valve 340 in cascade with valve 40. Modulating valve 340 comprises a piston 342 and a slider 344 coaxial therewith, the piston and the slider being urged apart by an intervening compression spring 343. An output line 48 of throttle valve 40 terminates at the left-hand end of the cylinder of valve 340 adjacent a face 345 of its piston 342, hydraulic pressure $p_1$ in line 48, thus tending to displace that piston to the right against the force of spring 343. As shown in the graph of FIG. 5, pressure $p_1$ is a linear function of a load-dependent pressure $p_0$ applied by cam N to plunger 42 against the force of spring 43. Output pressure $p_1$ is fed back via a line 49 to the right-hand end of slider 41 for controlling the entry of high-pressure oil from line 206 into the valve cylinder via a port 46 and the return of excess oil to the sump S by way of a venting port 44. The operation of this throttle valve, which controls the pressure $p_1$ by cracking open the ports 44 and 46 to maintain a balance between output pressure $p_1$ and the force of spring 43, is described in detail in prior U.S. Pat. No. 3,580,112. Plunger 42 has a gorge 42A which, in an advanced position thereof, connects a spur of conduit 48 to line 220 terminating at shift valves 70 and 90; upon a further advance of the plunger, this connection is extended to line 221 leading to other ports of the same valves. Thus, pressure $p_1$ is also effective to control the hysteresis of switchover during upshifting and downshifting as described in U.S. Pat. Nos. 3,580,112 and 3,593,599.

Pressure $p_1$ acts upon piston 342 of valve 340, against the force of spring 343, in much the same way as does pressure $p_0$ in the case of valve 40. Oil in line 206, under the supply pressure regulated by master valve 10, enters the valve 340 via a port 341 controlled by one of the heads of slider 344 whose other head controls a venting port 349; thus, an output pressure $p_2$ in line 222, originating at a point between ports 341 and 349, is proportional to the pressure of spring 343 and therefore to pressure $p_1$ as long as piston 343 is free to move to the right. The cylinder of valve 340, however, is provided with an internal shoulder 347 which stops this movement of the piston 342 at an intermediate point of the load range. From that point on, therefore, the compression of spring 343 does not increase any further regardless of a rise in pressure $p_1$. Thus, as likewise shown in FIG. 5, pressure $p_2$ varies linearly with the applied pressure $p_0$ up to a point $p_0'$ and thereafter remains substantially constant. This modulated pressure $p_2$ is applied by line 222 directly to the dampers 120 and 160 of clutch K2 and brake B1F; it is also effective at piston face 18A of master valve 10 to create a reaction force which determines the supply pressure in lines 205, 208 and 213–215, the actuating pressure for coupling elements B1F, K1 and K2 thus varying similarly to pressure $p_2$ which generally follows the law of variation of engine torque with fuel supply. The slope angle of the rising portion of pressure $p_2$ depends on the ratio of the effective areas of piston 342 and slider 344 at the ends 345 and 346 of the cylinder of valve 340. The maximum value of pressure $p_2$ is determined by the characteristic of spring 343.

Figure 4:
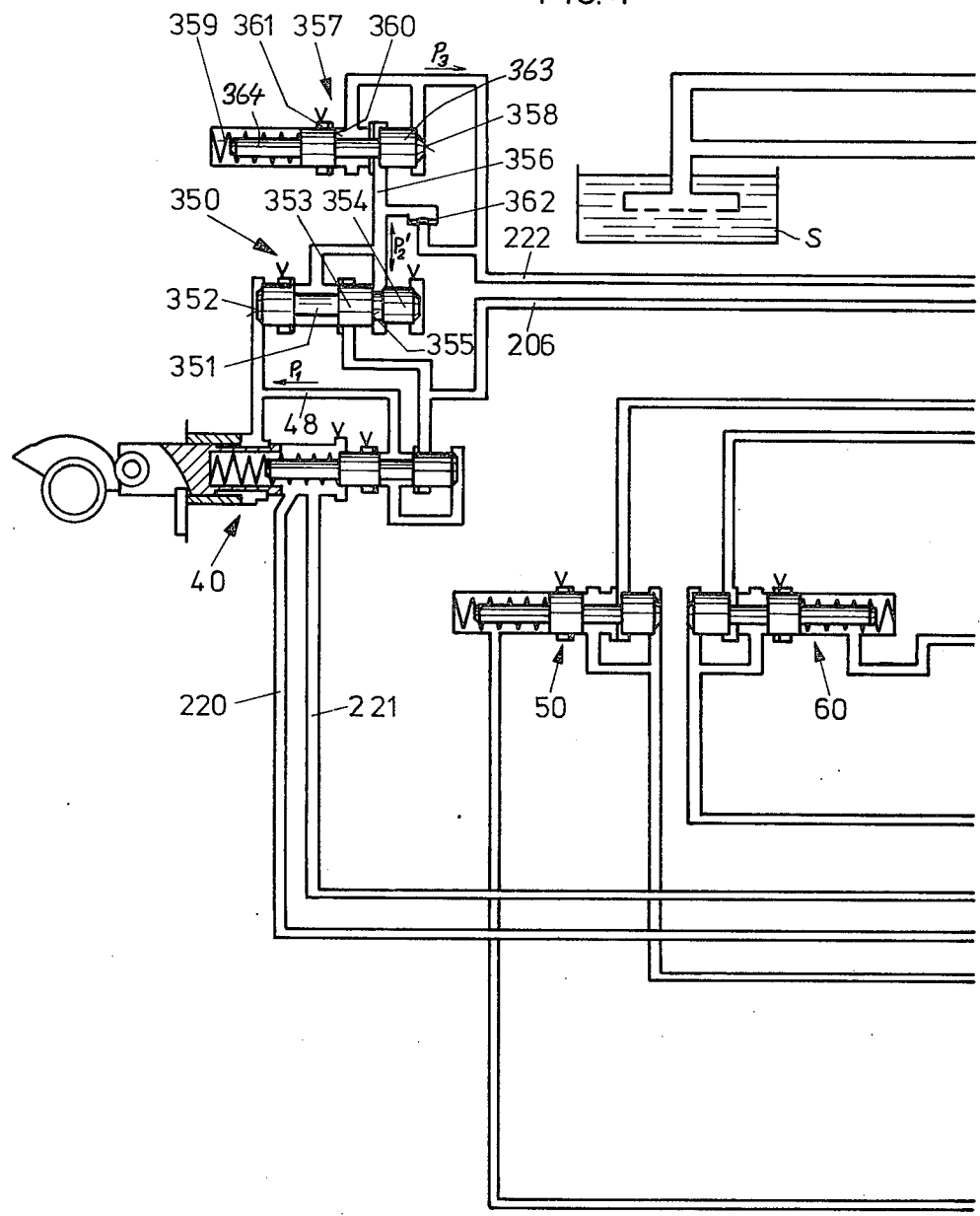
FIG. 4 is a view similar to FIG. 1, illustrating a modification.

In the modified system of FIG. 4 the throttle valve 40 is cascaded with a modulating valve 350 and a limiting valve 357. Valve 350 has a slider 351 whose left-hand end 352 is under the output pressure $p_1$ of throttle valve 40 and whose heads 353, 354, which are of different diameters, bracket a port 355 to which the output pressure $p_2'$ of valve 350 is fed back from a conduit 356. The interplay of pressures $p_1$ and $p_2'$ determines the extent to which the supply pressure of line 206 can build up in conduit 356 which opens into a port of limiting valve 357 controlled by a head 363 of a slider 364 thereof. Another head 360 of slider 364 normally blocks a venting port 361 leading to the sump S.

The output pressure $p_3$ of valve 357, developed in line 222 which originates between port 361 and the termination of conduit 356, is applied to an end face 358 of slider 364 and thus counteracts the force of a spring 359. As long as the product of pressure $p_3$ times the area of face 358 is less than the spring force, slider 360 is in its right-hand position and pressure $p_3$ substantially equals pressure $p_2'$ which in turn is proportional to pressure $p_1$ and therefore to load. As the output pressure $p_3$ exceeds a point $p_0$ in the load range, as shown in FIG. 5, slider 360 shifts to the left and blocks the line 222 so that the pressure in that line remains constant, as also seen in FIG. 5. A check valve 362 between conduit 356 and line 322 enables a rapid venting of that line when pressures $p_1$ and $p_2'$ drop below the critical point. The maximum value of pressure $p_3$ is determined by the characteristic of spring 359 and can vary between a lower limit, depending on pressure $p_1$, and an upper limit, given by the supply pressure in line 206.

We claim:

1. In a hydraulic load-control system for driving an output shaft from a fuel-powered engine with a variable torque ratio, including an operator-controlled accelerator for varying the fuel supply to said engine, a source of high-pressure fluid, drive-establishing means shiftable under fluid pressure from said source between torque ratios, and fluid-actuatable switchover means for controlling said drive-establishing means, the combination therewith of:
   first pressure-modulating means connected to said source for producing a fluid pressure varying generally proportionally to the speed of said output shaft, said first pressure-modulating means communicating with said switchover means for actuating same in an upshifting sense;
   biasing means for said switchover means opposing upshifting, said biasing means including second pressure-modulating means connected to said source;
   third pressure-modulating means connected to said source for producing a fluid pressure varying generally proportionally to load in an upper part of a load range as determined by a displacement of said accelerator from a retracted position to an advanced position, said third pressure-modulating means communicating with said switchover means for creating a hysteresis effect with upshifting at higher loads and downshifting at lower loads; and
   fourth pressure-modulating means connected to said source for producing a fluid pressure rising with increasing load in a lower part of the load range and remaining substantially constant in the remainder of said load range, said fourth pressure-modulating means communicating directly with said drive-establishing means for moderating the actuation thereof by said switchover means and further communicating with said second pressure-modulating means for progressively increasing the output pressure thereof in said lower part of the load range.

2. The combination defined in claim 1 wherein said second pressure-modulating means comprises a master valve inserted between said source and said switchover means, said third pressure-modulating means comprising a throttle valve operatively coupled with said accelerator and connected to an outlet of said master valve, said fourth pressure-modulating means comprising supplemental valve means in cascade with said throttle valve feeding a pressure-controlling port of said master valve in parallel with said drive-establishing means.

3. The combination defined in claim 2 wherein said supplemental valve means comprises a modulating valve with a slider displaceable by fluid pressure existing in an output line of said throttle valve.

4. The combination defined in claim 3 wherein said slider is spring-loaded and said modulating valve includes stop means for arresting said slider upon the fluid pressure in said output line rising to a predetermined value.

5. The combination defined in claim 4 wherein said modulating valve includes a piston elastically coupled with said slider and subjected to the fluid pressure in said output line, said stop means being disposed in the path of said piston.

6. The combination defined in claim 3 wherein said supplemental valve means further comprises a limiting valve in cascade with said modulating valve.

7. The combination defined in claim 6 wherein said limiting valve is provided with a spring-loaded piston displaceable under fluid pressure from said modulating valve and with venting means for relieving the last-mentioned pressure upon a predetermined displacement of said piston from a normal position.

8. The combination defined in claim 7 wherein said limiting valve has an inlet and an outlet interconnected by a pressure-relieving check valve.

9. The combination defined in claim 2 wherein said source is an engine-driven pump.

10. The combination defined in claim 9 wherein said drive-establishing means comprises at least one coupling element provided with damping means controlled by fluid pressure from said fourth pressure-modulating means.

* * * * *